(12) United States Patent
Pfeiffer et al.

(10) Patent No.: US 6,301,835 B1
(45) Date of Patent: Oct. 16, 2001

(54) DOOR MODULE FOR MOTOR VEHICLES WITH PLASTIC FUNCTIONAL COMPONENTS

(75) Inventors: Bernhard Pfeiffer, Hünstetten; Ulrich Haack, Alsbach-Hähnlein; Frank Reuter, Mömlingen, all of (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/357,754

(22) Filed: Jul. 21, 1999

(30) Foreign Application Priority Data

Jul. 23, 1998 (DE) .............................................. 198 33 185

(51) Int. Cl.$^7$ ...................................................... B60J 5/04
(52) U.S. Cl. ........................................... 49/502; 296/146.5
(58) Field of Search .................. 49/502, 501; 296/146.5, 296/146.7

(56) References Cited

U.S. PATENT DOCUMENTS

| | | | |
|---|---|---|---|
| 4,785,585 | * 11/1988 | Grier et al. ............................ | 49/502 |
| 4,800,648 | * 11/1989 | Nakayama et al. ................. | 49/502 X |
| 4,848,829 | * 7/1989 | Kidd .................................... | 49/502 X |
| 4,869,670 | * 9/1989 | Ieda et al. ....................... | 296/146.5 X |
| 4,882,842 | * 11/1989 | Basson et al. ................. | 296/146.5 X |
| 4,907,836 | * 3/1990 | Ueda et al. ........................ | 49/502 X |
| 5,425,206 | 6/1995 | Compeau et al. . | |
| 5,461,830 | * 10/1995 | Dupuy .................................. | 49/449 |
| 5,535,553 | 7/1996 | Staser et al. . | |
| 5,820,191 | * 10/1998 | Blakewood et al. .......... | 296/146.7 X |
| 5,906,072 | * 5/1999 | Feige et al. ............................ | 49/502 |

* cited by examiner

Primary Examiner—Jerry Redman
(74) Attorney, Agent, or Firm—Connolly Bove Lodge & Hutz LLP

(57) ABSTRACT

The invention relates to a one-piece door module for motor vehicles, encompassing a self-supporting metal carrier panel, which also encompasses, as integral constituents, a multiplicity of plastic functional components which are connected securely and permanently to the metal carrier panel in one operation by the outsert technique.

10 Claims, 2 Drawing Sheets

DOOR MODULE FOR MOTOR VEHICLES WITH PLASTIC FUNCTIONAL COMPONENTS

BACKGROUND OF THE INVENTION

1. Field of the Invention

The present invention relates to a one-piece door module for motor vehicles, encompassing a selfsupporting metal carrier panel (for example made from punching-and-benching sheet) and a multiplicity of retaining elements in the form of elevations, depressions and cutouts, which facilitates the assembly of the motor vehicles.

2. Description of the Related Art

Increasing automation in the assembly of motor vehicles make it necessary or at least highly desirable that assembly units which belong together and are made from rigid and movable parts can be assembled separately and checked for correct functional capability, if possible prior to their final incorporation into the motor vehicle being produced.

Conventional door modules are usually composed of a metal panel, to which necessary functional components such as retaining and guiding elements are subsequently screwed, bolted or welded. Door modules made from metal advantageously have a relatively high intrinsic stability. However, not all functional components can be formed directly from metal, they instead additionally comprise other materials, usually plastic, which necessitates subsequent working of the prefabricated metal body in order to fix the functional components of different materials movably or immovably at their intended place of use.

SUMMARY OF THE INVENTION

The object was therefore to develop a door module with a metal carrier panel which is easy to produce industrially but already contains all necessary retaining, guiding and operating elements and therefore simplifies machine assembly still further.

This object is achieved by means of a door module of the generic type described at the outset, the characterizing features of which are that it also encompasses, as integral constituents, plastic functional components which are connected securely and permanently to the metal carrier panel in one operation.

For the purposes of the invention, a door module is a one-piece self-supporting carrier panel whose three-dimensional state is essentially matched to the shape of the motor vehicle door into which it is to be incorporated. The thickness of the carrier panel may vary from 0.1 to 5 cm. A door module represents a semi-finished product into which the components arranged in the vehicle door, such as window lifters, door openers, loudspeakers, and the like, are usually fitted and then form a functional unit.

The door module according to the invention encompasses a metal carrier panel. All bendable and punchable metals, such as sheet, for example, are suitable as metals, but those which have a high corrosion resistance, for example galvanized sheet, are preferred. Lightweight metals of aluminum or magnesium alloys are particularly preferred, provided that they have adequate mechanical strength.

The door module according to the invention contains numerous plastic functional components as integral constituents. Within the scope of the invention, the feature integral means that the functional components form a unit with the metal carrier panel and cannot be detached from the metal body. This feature is realized by the so-called outsert technique. The outsert technique is known and described, for example, in Kunststoff-Journal [Plastics Journal], October 1994, pages 21 to 23. It represents a combination of punching-bending and injection-molding techniques, the plastic being injection-molded onto the prefabricated metal plate in precisely defined, limited areas in one operation. The fixing of the plastic functional components takes place without bonding agents, instead it represents a mechanical anchorage in which plastic for example flows in a molten state around an edge and then solidifies. The outsert technique is usually used for small components for electrical equipment such as car radios or video recorders, but so far it has not yet been used for door modules.

Suitable as plastics for the functional components of the door module according to the invention are thermoplastic materials. In addition to standard polymers such as polyolefins, preferably to be mentioned are also plastics based on polypropylene, polyamide, polyester, polyphenylene oxide, polyoxymethylene, polyphenylene sulfide, polyurethane, polycarbonate or blends made from polyester with acrylonitrile-butadiene-styrene copolymers or with acrylonitrile-styrene-acrylate graft polymers, which may also be reinforced, if appropriate, with glass fiber or carbon fiber. Polyethyleneterephthalate or polybutyleneterephthalate may be used in particular as polyesters. The glass-fiber reinforcement may optionally be brought about with long fibers and/or with short fibers. According to the invention, it is also possible for the individual functional components to consist of different plastics or for a single functional component to consist of a plurality of different plastics. In this case, all that is necessary is to carry out the injection-molding steps sequentially or simultaneously by means of a plurality of injection-molding units.

The door module according to the invention has a multiplicity of functional components, i.e. holding and guiding elements protruding from the surface of the carrier panel as integral constituents, into which for example further functional components, including those to be fixed firmly in one location, can be permanently fitted or whose shape has been constructed so that movable functional components such as gearwheels or levers are guided and controlled in their correct direction of movement. The term functional components also covers electrical components, which are directly connected in an electrically conductive manner. In particular, window lifter profiles for the glass side window arranged in the motor vehicle door so as to be movable, and also the retaining elements for the electric motor which moves the side windows, are integrated into the door module according to the invention, or molded-on in a folded-out state. Guide profiles for the side window may preferably also have been integrated in the areas of the door module according to the invention, close to its edges.

In addition, it may be particularly advantageous for the door module, or parts of the functional components, preferably at least in the area of the window lifter profiles for the side window, to be subjected to a particular post-treatment in order to ensure particularly high wear resistance with respect to the retaining elements for the side windows, specifically in the area of the window lifter profiles. The retaining elements for the side windows, which have been arranged on the window lifter profiles so as to be movable, are normally made from polyacetal, in particular from polyoxymethylene. For the post-treatment, the door module according to the invention may be subjected to a corona spray discharge or a plasma treatment or a flame treatment, which is applied at least in the area of the window lifter profiles for the side window.

In another embodiment of the invention, the wear resistance with respect to the retaining elements made from polyoxymethylene may also be brought about by pressing or injecting plastic material of inherently high wear resistance with respect to polyoxymethylene behind the door module in the area of the critical locations in the window lifter profiles for the side window.

In another embodiment of the invention, the door module may also be combined with an electrically insulating film made from polyethylene, polypropylene, cycloolefin copolymer, polyester, polyphenylene sulfide, polyimide or polyether imide. In particular, electrical conductor tracks which serve for the electrical connection of electrically operated functional components in the area of the door module, such as window lifter motors or loudspeakers, may have been applied to such an electrically insulating film. At the same time, the electrically insulating film may perform the important function of an additional moisture barrier.

The invention will be described in still further detail below by way of example, for the person skilled in the art, using drawings.

DETAILED DESCRIPTION OF THE DRAWINGS

Figure 1:
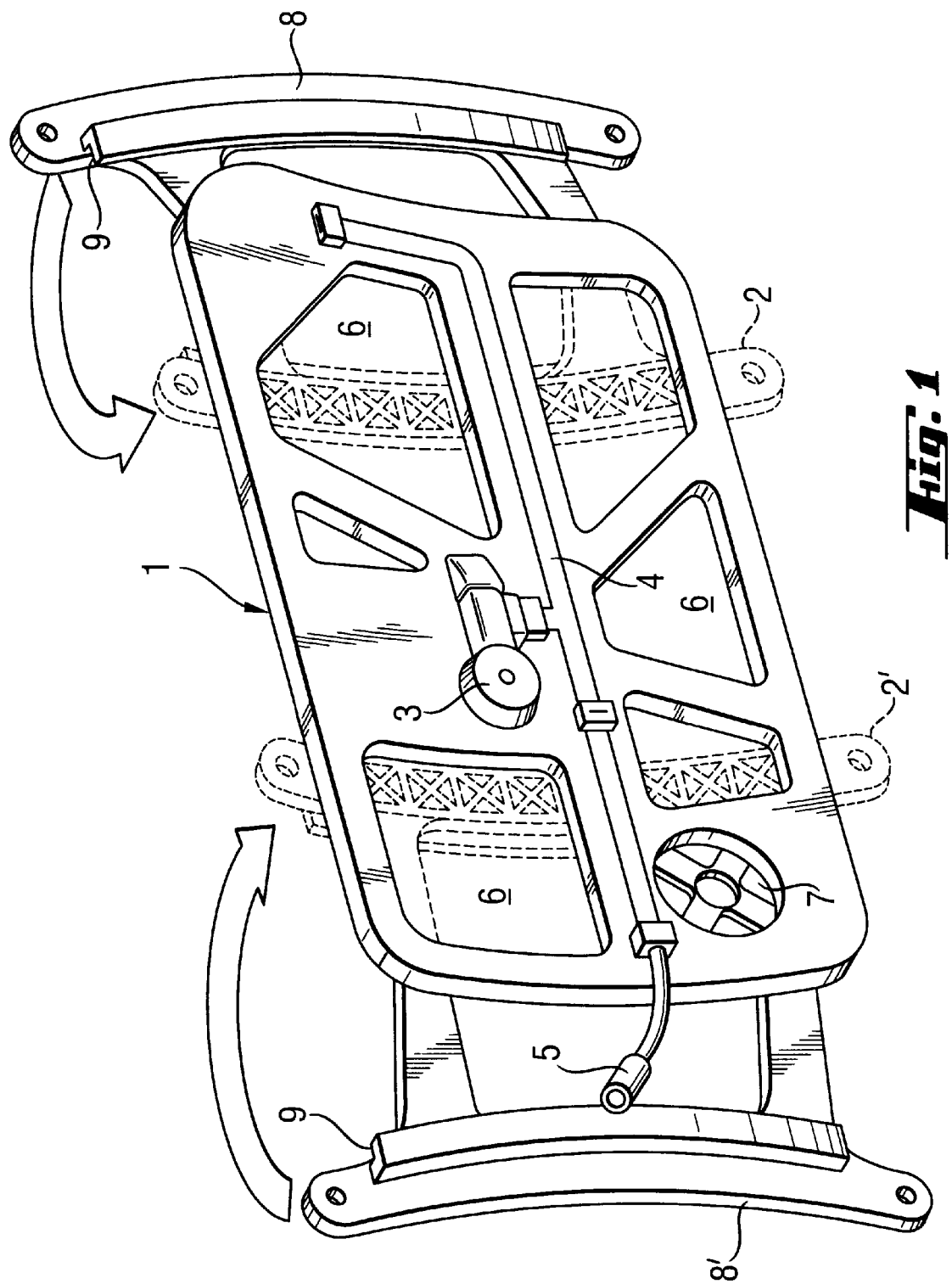
FIG. 1 shows a perspective view of a door module according to the invention from the side facing the passenger compartment.

Reference numerals in FIG. 1 highlight the carrier panel 1, whose three-dimensional shape has essentially been matched to the slightly bowed shape of a motor vehicle door. The vertically arranged window lifter profiles 2/2' for the side windows, which are not shown, are an integral constituent of the door module and replace the metal window lifter profiles normally applied subsequently in this area. The window lifter profiles are represented in FIG. 1 simultaneously in the folded-out state 8/8' and (dashed lines) folded-in state 2/2'. During the production of the door module according to the invention, they are molded in the folded-out state and are later folded in during assembly, expediently being secured against unintentional folding back by suitable retaining elements, such as snap hooks or similar fastening elements. In addition, it can also be seen in FIG. 1 that, for better window lifting accuracy, the window lifter profiles 8/8' are provided with grooves 9, which to improve their wear resistance are subjected to a post-treatment, which cannot be seen, by plasma or corona treatment.

To improve weight reduction in the embodiment shown, the metal carrier panel 1 does not have a continuous surface but has various trapezoidal cutouts 6 and in particular also a retainer 3 for the electronic motor, which is not shown, and a for example round cutout 7 for the loudspeaker. In these areas, various fastening elements of different plastics have been molded on. The electrical feed 4 in the form of conductor tracks can also be seen in FIG. 1, and can receive electrical power via the central electrical supply 5 which can be represented by a plug. The fastening elements are also molded onto the carrier panel 1 by the outsert technique.

Figure 2:
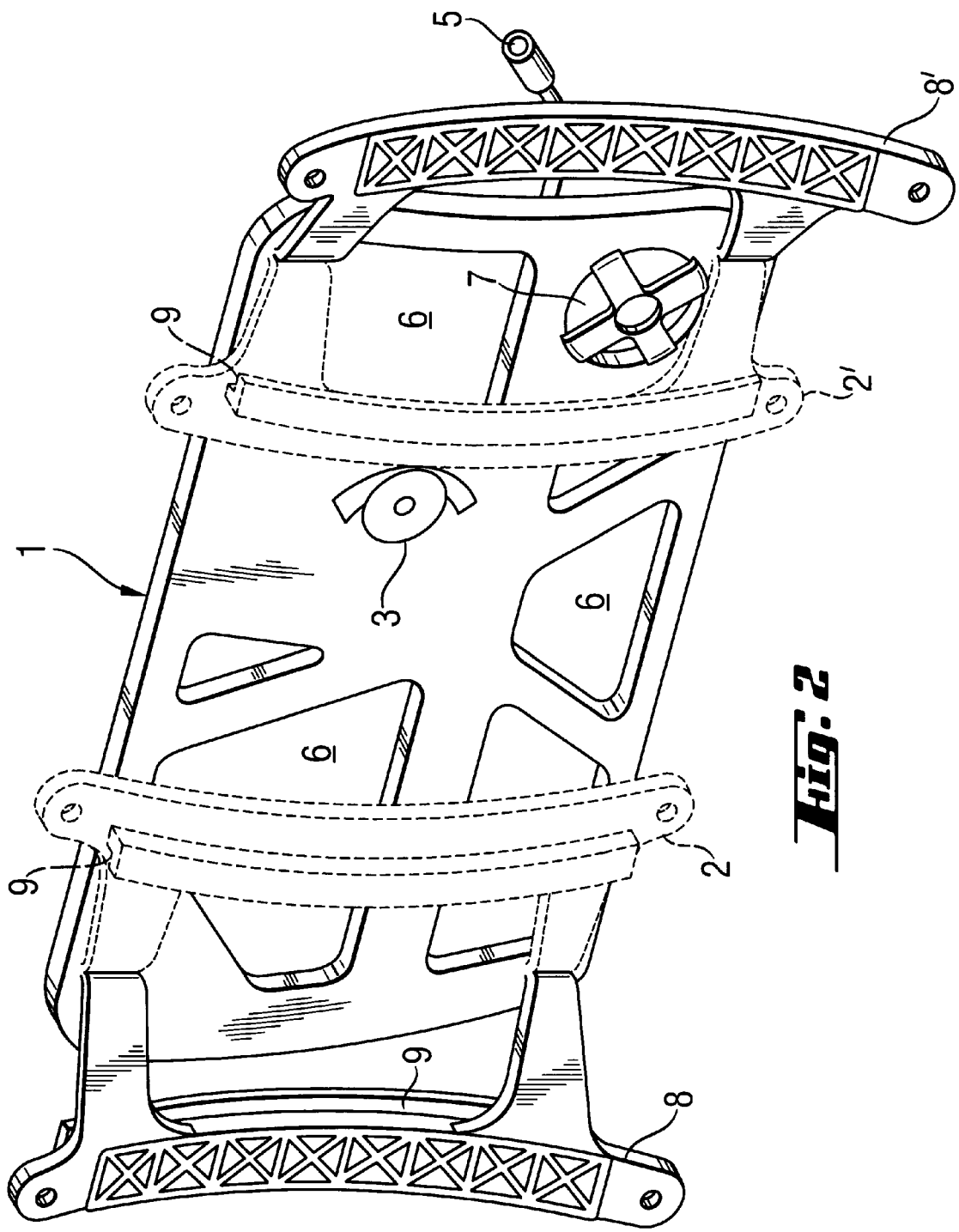
FIG. 2 shows a perspective view of a door module according to the invention from the side facing away from the passenger compartment.

The same reference numerals in FIG. 2 have the same meanings as in FIG. 1. In particular, this also shows the carrier panel 1 and the vertically arranged window lifter profiles 2/2' for the side windows, which are not shown. The carrier panel 1 has trapezoidal cutouts 6, a retainer 3 for the electric motor and a round cutout 7 for the loudspeaker. At the side, the central electrical supply 5 can be seen, and leads to the conductor tracks, which are not visible in this view. In addition, it can also be seen from the figures that the window lifter profiles 2/2' are folded-out during production (8/8') and are subsequently swiveled around into the area of the metal carrier panel 1, as represented by dashed lines, and snapped in place.

What is claimed is:

1. A one-piece door module for motor vehicles comprising a one-piece self-supporting metal carrier panel and thereon, as integral constituents, plastic functional components made of a thermoplastic material selected from the group consisting of plastics based on
    (a) polypropylene,
    (b) polyamide,
    (c) polyester,
    (d) polyphenylene oxide,
    (e) polyoxymethylene,
    (f) polyphenylene sulfide,
    (g) polyurethane,
    (h) polycarbonate,
    (i) blends made from polyester with acrylonitrile-butadiene-styrene copolymers and
    (j) blends made from polyester with acrylonitrile-styrene-acrylate graft polymers
    and wherein the thermoplastic material is reinforced with glass fibers or carbon fibers and said plastic functional components are connected securely and permanently to the metal carrier panel in one operation and wherein said self-supporting carrier panel has a three-dimensional shape which is essentially matched to a shape of a motor vehicle door into which it is to be incorporated and wherein said plastic functional components include window lifter profiles in the folded-out state formed around and in proximity with said carrier panel.

2. The door module as claimed in claim 1, wherein said plastic functional components encompass window lifter profiles for a movable side window and at least one retaining element for an electric motor for moving said side window.

3. The door module as claimed in claim 2, wherein said window lifter profiles are made of a thermoplastic material having high wear resistance.

4. The door module as claimed in claim 2, wherein said window lifter profiles further comprise at least one movable retaining element each for connecting said side window.

5. The door module as claimed in claim 4, wherein said window lifter profiles are made of a thermoplastic material having high wear resistance with respect to said movable retaining element.

6. The door module as claimed in claim 2, wherein said electrically insulating film simultaneously functions as a moisture barrier.

7. The door module as claimed in claim 1, comprising an electrically insulating film made of polyester, polyethylene, polypropylene, cycloolefin copolymer, polyphenylene sulfide, polyimide or polyether imide, and wherein electrical conductor tracks which serve for the electrical connection of electrically operated functional components in the area of the door module have been applied to the electrically insulating film.

8. The door module as claimed in claim 1, wherein said plastic functional component is a carbon-fiber reinforced thermoplastic.

9. The door module as claimed in claim 1, wherein said plastic functional component is a glass-fiber reinforced thermoplastic.

10. The door module as claimed in claim 1, wherein said plastic functional components are made from a) a plurality of different thermoplastic components or
b) a single functional component made from a plurality of different thermoplastics.

* * * * *